Feb. 24, 1931. S. BERGSTEIN Re. 17,975

MACHINE AND METHOD FOR UNFOLDING PAPER TRAYS

Original Filed Dec. 31, 1929 2 Sheets-Sheet 1

INVENTOR.
Samuel Bergstein
BY
Allen & Allen
ATTORNEYS

Feb. 24, 1931. S. BERGSTEIN Re. 17,975

MACHINE AND METHOD FOR UNFOLDING PAPER TRAYS

Original Filed Dec. 31, 1929 2 Sheets-Sheet 2

INVENTOR.
Samuel Bergstein
BY
Allen Allen
ATTORNEYS

Reissued Feb. 24, 1931

Re. 17,975

UNITED STATES PATENT OFFICE

SAMUEL BERGSTEIN, OF CINCINNATI, OHIO, ASSIGNOR TO INTERSTATE FOLDING BOX COMPANY, OF MIDDLETOWN, OHIO

MACHINE AND METHOD FOR UNFOLDING PAPER TRAYS

Original No. 1,784,571, dated December 9, 1930, Serial No. 417,695, filed December 31, 1929. Application for reissue filed January 9, 1931. Serial No. 507,704.

This invention relates to a machine for unfolding paper trays, having particular reference to a machine for preparing trays to receive baked products, and other food products which are delivered in packages, the packages including the trays, being enclosed in sanitary paper wrappings.

The trays are furnished to the manufacturer knocked-down and must be opened by hand, under the present practice, for receiving the contents. This adds materially to the time and labor cost of packaging.

The object attained in the invention consists in the provision of a machine for opening the knocked-down bread trays and unfolding them so that the trays will readily open to upright position for receiving the contents, which materially facilitates the work of packaging.

The machine is herein shown and described in two forms. On one form of the machine the trays, as originally folded knocked-down, are partially opened and again folded, inversed to the original foldings. The trays are then conveniently stacked by the machine for packing them in shipping cartons.

On the other form of the machine the trays are unfolded in the manner described, and are delivered in a condition which permits the trays to open to upright position to an automatic packaging machine on which the contents are placed in the trays and together with the trays are wrapped in a sanitary paper cover.

The unfolding of the trays also results in changing their contour and in producing a shape that lends itself more readily to the operations of the automatic wrapping machine.

In the accompanying drawings which serve for illustrating the invention:—

Figure 1:
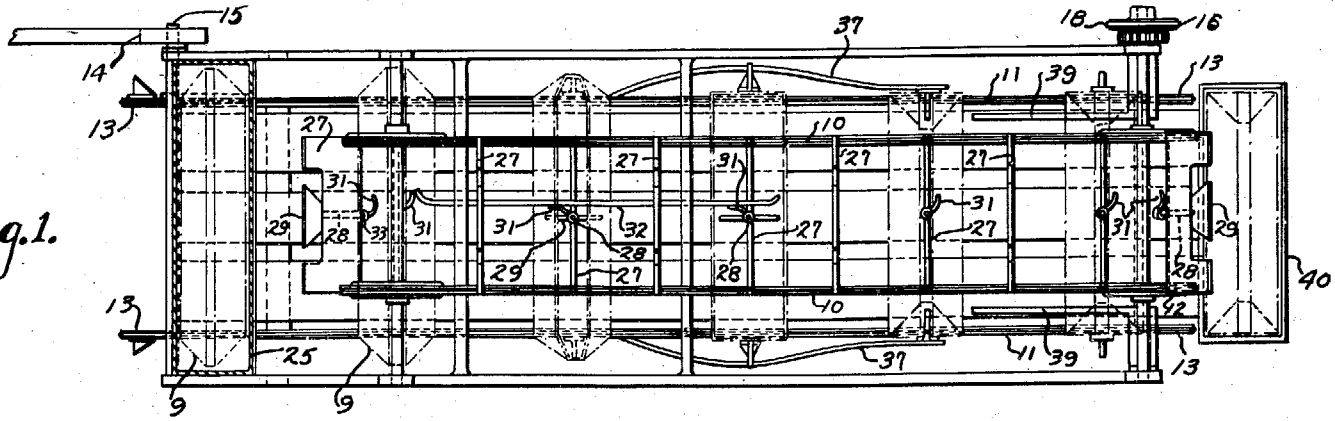
Figure 1 is a plan view of the machine for unfolding the trays.

The structure of the machine consists in opposite upper and lower chain carriers 10—11 which operate in parallel planes over sprockets 12—13. Power is applied to the lower carrier through a pulley 14 on shaft 15, on which the front set of sprockets 13 are supported. The driving connection from the lower to the upper carrier is through a chain and sprocket connection 16—17—18, gears 19—20 to shaft 21 on which rear sprockets 12 of the upper carrier are supported.

Figure 5:
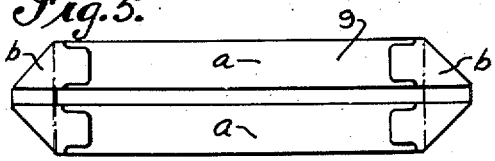
Figures 5, 6 and 7 are views of the trays illustrating the successive steps of unfolding and opening.

The trays 9 as originally folded are illustrated in Fig. 5. They are supplied to the machine from a hopper 22, being drawn from the hopper singly by fingers 23 arranged in equal spacings on carrier 11 which moves across the open ends of the bottom of the hopper, fingers 23 acting successively to engage the lowermost tray and to move it along the carrier. Guides 24 extend across the bottom of the hopper and support the trays at the required elevation for removing them singly, an adjustable gate 25 acting to restrict the discharge opening substantially to the thickness of a tray. Guides 24 are offset, as indicated at 26 to cause the trays as they are removed from hopper to move in a slightly lower plane in fuller engagement with the fingers 23 to prevent disengagement of the trays by the fingers 23.

Figure 2:
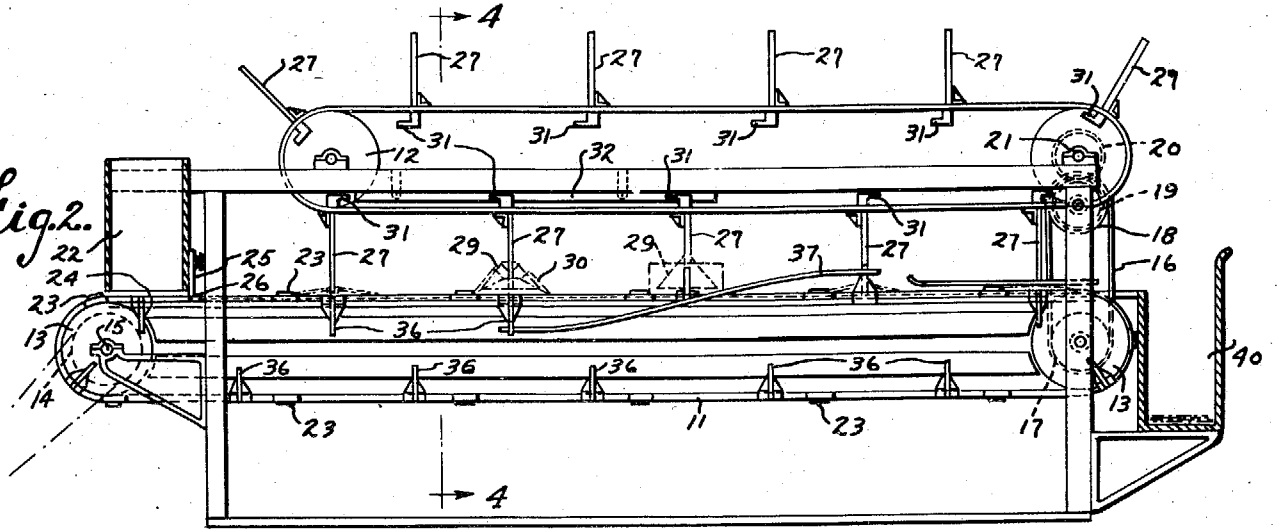
Figure 2 is a view of the machine in side elevation.

A series of tray openers are equally spaced on the upper carrier each consisting of a member 27 extended between the opposite carrier 10, and moved into engagement with the trays, as the carriers are moved into their intermediate course, with the lower edge of part 27 extended between the opposite side —*a* of a tray. A stem 28 is supported to rotate in part 27 in an arc of about 90° and has a blade 29 fixed to its lower end which acts to partially open sides —*a* of tray, as indicated at 30, Fig. 2, when part 28 is operated. A finger 31 fixed in the upper end of part 28 engages a fixed actuator 32 which acts to rotate part 28 and to hold it in rotated position during a coinciding action on the trays by folding devices supported on the lower carrier. A spring 33 acts to return part 28 to normal position after finger 31 moves out of engagement with actuator 32.

Figure 7:
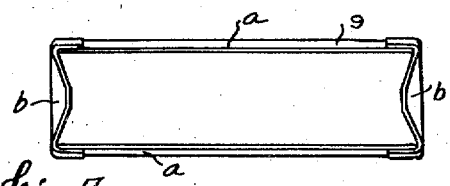
Figure 6:
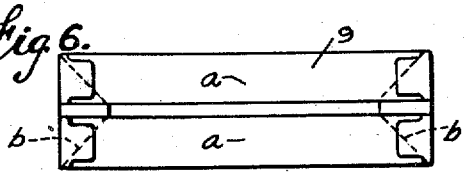

On the lower actuator are equally spaced folders consisting of a link 34 secured to the carrier 11, a plate 35 hinged on link 34 and having a part 36 which extends downward, in the upper course of the carrier, into engagement with a fixed actuator 37 which acts to move part 35—36 through an arc of approximately 180°. This movement of the lower folders acts to move the ends —*b* of the trays upward and inward in fold which is inverse to the original fold of the ends, the fold being timed with the operation of the tray openers of the upper carrier which open the sides —*a* sufficiently for permitting the ends —*b* to be turned inward in a reverse fold as indicated in Fig. 6. A spring 38 acts to return part 35—36 to normal position after part 36 moves out of engagement with actuator 37. As the unfolded trays are moved further along they are engaged by pressure bars 39 which are adjustable vertically for compressing the unfolded trays to the required extent for reopening of the trays to upright position. The trays are then delivered by the carriers to the stacker 40 in the arrangement shown in Figs. 1–2. The inverse end folds of the trays as they are delivered into hopper 40 act to tension the ends upward and cause the trays to spring partially open, as illustrated in Fig. 7, when pressure is removed from them. Thus the trays as they are removed from a shipping carton are ready for receiving the contents.

Figure 3:
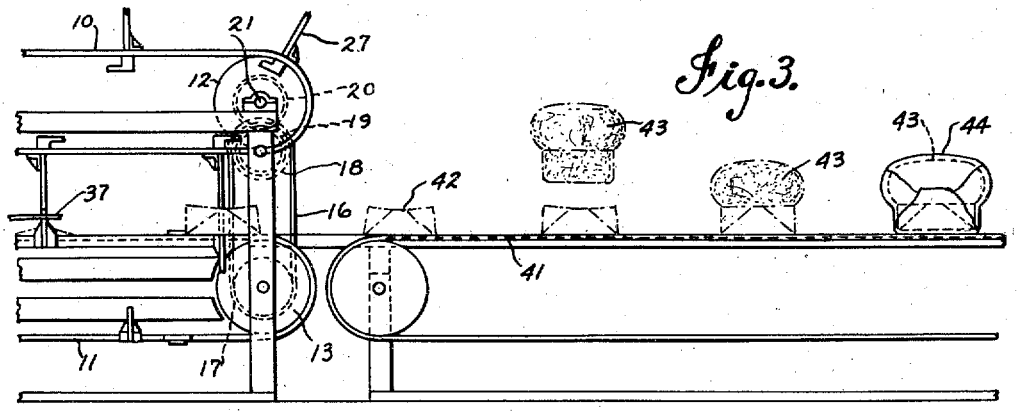
Figure 3 is a detail view in side elevation of the tray folding and the automatic wrapping machine.
Figure 4:
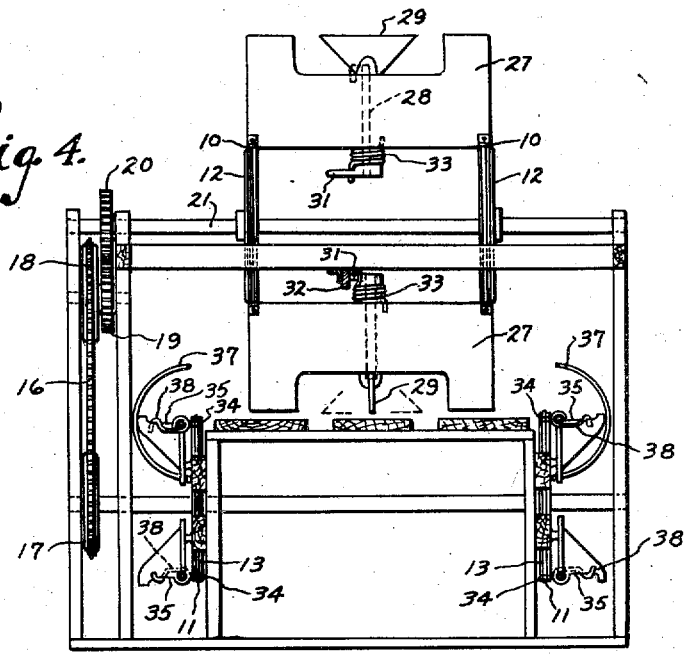
Figure 4 is a sectional view on line 4—4 of Fig. 2.

In the modified arrangement of the machine illustrated in Fig. 3, the trays are delivered from the unfolding machine to a carrier 41, which is part of the automatic filling and wrapping machine. As the trays are delivered on the carrier they spring open, due to the tension in the folds, substantially to vertical position, as indicated at 42, ready to receive the contents 43, and are then wrapped as indicated at 44. The structural arrangement of the wrapping machine forms no part of the invention, but the co-ordinated operations of opening the trays, moving them into position on the wrapping machine, placing the contents into the trays and wrapping the packages, are claimed as a method of packaging products of this character.

I claim as my invention:

1. A machine for unfolding knock-down paper containers including means for partially opening the containers and means for effecting inverse folds of portions thereof as the containers are moved progressively on said machine.

2. A method of packaging consisting in opening knocked-down paper containers and moving them progressively, in moving the contents into the containers, and in wrapping the containers and contents into a package in like progressive order.

3. A method of packaging consisting in unfolding knocked-down paper containers for effecting self-opening thereof and moving the open containers progressively, in moving the contents into the containers, and wrapping the containers and contents into a package in like progressive order.

4. A machine for unfolding knocked-down paper containers including opposite carriers operable in unison into co-ordinated operating relation one carrier with the other, one of the carriers acting to move the containers progressively, devices attached to the other carrier acting to partially open the containers, and devices attached to the first named carrier acting to effect inverse folds of portions of the containers.

5. A machine for unfolding knocked-down paper containers having their opposite ends folded outward, means acting on intermediate portions of the containers to partially open them, and means acting to fold said ends inversely as the containers are moved progressively on said machine.

6. A machine for unfolding knocked-down paper containers including means for partially opening the containers, means for effecting inverse folds of portions thereof, and means for flattening the folded containers as they are moved progressively on said machine.

7. A machine for unfolding knocked-down paper containers including opposite carriers operable in unison, one of the carriers acting to move the containers progressively, devices attached to the other carrier moved into engagement with the containers on the first named carrier and acting to hold the containers extended and to partially open them, and devices attached to the first named carrier acting to effect inverse folds of portions of the containers as they are moved progressively on said machine.

8. A machine for unfolding knock-down paper containers including opposite carriers operable in unison, one of the carriers acting to move the containers progressively on said machine, devices attached to the other carrier movable into engagement with the containers moved along on the first named carrier, an actuator along the plane of movement of the carriers acting to operate said devices for partially opening the containers, folders attached to the first named carrier, and actuators along the plane of movement of the carriers acting to operate the folders for effecting opposite inverse folds of portions of the containers as they are moved along between the carriers.

9. A machine for unfolding knocked-down paper containers including opposite carriers provided with means for moving the containers progressively, means for effecting inverse folds of portions of the containers, and means adjustable for variably compressing the folded portions of the containers.

10. A machine for opening diagonal corner folded paper containers which comprises means for partially opening the containers from flat folded form, and means for engaging the ends of the containers which are partially raised incident to said partial opening and forcing them toward the body of the container, thereby causing the walls of the container to become erect.

11. The method for opening diagonal corner folded paper containers which consists in partially opening the containers as they are moved along and then forcing the partially opened end flaps toward the body of the container to cause the walls of the container to remain in erect position.

12. A machine for opening diagonal corner folded paper containers for preparing them to receive their contents, which comprises means for partially opening the containers from flat folded form and means for engaging the ends of the containers which are partially raised incident to said partial opening and bending them in an arc upwardly, thereby causing the walls of the container to become erect.

13. The method for opening diagonal corner folded paper containers which consists in mechanically moving the containers along and mechanically bending the end flaps in an arc upwardly, thereby causing the container walls to assume an erect position.

14. A method of packaging consisting in opening up knocked-down paper containers during their progressive movement in sequence by opening up the side walls of the containers and subsequently bending upwardly the end walls of the containers, and thereafter moving the contents into the opened up containers and wrapping the containers and contents into a package in progressive order.

SAMUEL BERGSTEIN.